United States Patent Office 2,965,626
Patented Dec. 20, 1960

2,965,626

ETHYLENE POLYMERIZATION PROCESS

Frank L. Pilar, Cincinnati, Ohio, and Herbert N. Friedlander, Homewood, and Omar O. Juveland and Edmund Field, Chicago, Ill., assignors to Standard Oil Company, Chicago, Ill., a corporation of Indiana No Drawing. Filed Mar. 28, 1956, Ser. No. 574,367

7 Claims. (Cl. 260—94.9)

This invention relates to novel polymerization catalysts and polymerization processes. The present invention provides processes suitable for the polymerization of compounds containing ethylenic unsaturation. It is especially suitable for the homo- or hetero-polymerization of hydrocarbons containing ethylenic unsaturation, particularly vinyl monoolefinic hydrocarbons. By the process of the present invention, unbranched, normally gaseous 1-alkenes can be polymerized to yield normally solid materials of high molecular weight, especially highly crystalline, resinous materials.

One object of our invention is to provide novel catalysts for the polymerization of organic compounds containing ethylenic unsaturation. More specific objects are to provide novel catalysts and processes for the polymerization of vinyl monoolefinic hydrocarbons. An additional object is to provide novel catalysts and processes for the polymerization of unbranched, normally gaseous 1-alkenes to produce relatively dense, resinous polymers. Yet another object is to provide new catalysts and processes for the polymerization of ethylene and/or other normally gaseous, unbranched 1-alkenes to produce solid polymers having high molecular weights and high degrees of crystallinity. A further object is to provide processes for the production of isotactic polymers from propylene, 1-butene, styrene and other monomers which offer the possibility of yielding isotactic polymers (note G. Natta, J. Polymer Sci. 25, 143-154 (April 1955)).

In accordance with our invention, organic compounds containing ethylenic unsaturation are polymerized readily under relatively mild polymerization conditions with catalysts (hereinafter specified) and catalyst promoters to produce addition polymers, and in many cases, normally solid polymers. As catalyst promoters, we use alcohols, i.e., organic compounds comprising a hydroxyl group linked to a carbon atom thereof, in small proportions based on the weight of the catalyst.

The catalysts employed in the polymerization process are prepared by mixing a salt of a transition metal selected from groups 4, 5, 6 or 8 of the Mendeleef periodic table with an alkali reagent selected from the group consisting of the alkali metals or their hydrides or hydrocarbon derivatives, or a mixture of two or more of the aforesaid alkali reagents. The admixture can be effected in an inert liquid reaction medium such as a saturated hydrocarbon. The admixture of the metal salt and alkali reagent appears to result in partial reduction of the positive valence state of the metal contained in said salt; it also appears that the formation of more or less highly colored complexes occurs between the partially reduced salts and alkali reagents and/or other interaction products.

The molar ratios of polyvalent metal salt and alkali reagent can generally be varied broadly over the range of about 0.1 to about 10, more or less. It is preferred to use a molar excess of reducing agent (the alkali reagent) with respect to the polyvalent metal salt. In some cases the interaction proceeds at an appreciable or even high rate at room temperature; however, the temperature can be varied, depending on the specific reactants, between about −20° C. and about 300° C. The admixture can be effected in the presence or absence of the monomer or mixture of monomers which is to be polymerized. The resultant complex can be stabilized by adding small proportions of a highly reactive olefin thereto, e.g. styrene, indene or the like.

We have found that the polymerization activity of the catalyst prepared by reaction of alkali reagents with the specified metal salts can be substantially increased (as evidenced by increased yields of polymer under otherwise comparable conditions) by the inclusion of an alcohol in the reaction zone. The proportion of alcohol which is employed can vary from about 0.01 to about 20% by weight, based on the weight of the alkali reagent which is employed in the preparation of the catalyst, but is usually within the range of about 1 to about 10 weight percent, preferably about 3 to about 6 weight percent. The alcohol promoter can be introduced in one or a plurality of charges, intermittently or continuously, in the step of catalyst preparation; with the polymerization feed stock or as a separate charge to the reaction zone before or during polymerization.

Polymerization can be effected at selected temperatures which vary in accordance with the polymerization activity of the specific monomer(s), catalysts, promoter, desired reaction rate and the type of product which is desired. The selected polymerization temperatures generally fall within the range of about −40° C. to about 300° C., more often about 0° C. to about 250° C.; say about 25° C. to 175° C. for ethylene and similar monomers.

The preparation of catalysts and the polymerization are preferably effected in the absence of impurities which react with and consume the catalysts or the components of the catalytic mixture, such impurities being oxygen, carbon dioxide, water, etc.

Polymerization can be effected at atmospheric pressure or even lower pressures, but it may be advantageous to use superatmospheric pressures in order to obtain desirable monomer concentrations in contact with the catalyst. Thus, the polymerization can be conducted at pressures up to 10,000 p.s.i. or even higher pressures. Usually polymerization is effected at pressures between about 50 and about 2000 p.s.i.a.

The weight ratio of catalyst mixture to monomer can generally be varied in the range of about 0.01 to about 10% by weight, for example, about 0.1 to about 5 weight percent; even 100 weight percent catalyst can be used in flow operations.

Polymerization can be effected by contacting the unsaturated feed stock at the selected temperature and pressure with the mixture produced by the interaction of the catalyst components or with individual components of said mixture which exhibit catalytic activity.

Polymerization is preferably performed in the presence of various reaction media which remain liquid under the selected polymerization conditions of temperature and pressure. We prefer to employ relatively inert liquid reaction media such as saturated hydrocarbons, aromatic hydrocarbons, relatively unreactive alkenes, or cycloalkenes, perfluorocarbons, chloroaromatics or mixtures of suitable liquids.

Suitable agitation of the catalyst and monomers(s) is provided to secure effective contacting by means which are well known. Removal of the heat generated in polymerization can be effected by known means.

Through the present process, we can convert ethylene to wax-like homopolymers having an approximate specific viscosity ($\times 10^5$) between about 1000 and 10,000 and tough, resinous ethylene homopolymers having an approximate specific viscosity ($\times 10^5$) of 10,000 to more than 300,000. Propylene can be polymerized by the present process to normally solid materials which soften at temperatures well above room temperature, for example, at least about 75° C. or even much higher temperatures (in some cases exceeding the melting points of high molecular weight, solid polyethylenes).

The following examples are provided to illustrate the invention but not unduly to limit its broad scope.

In the following examples, the Staudinger specific viscosities were determined upon solutions of 0.125 g. of polymer in 100 ml. xylenes at 110° C. The melt viscosities at 145° C. were determined by the method of Dienes and Klemm, J. Appl. Phys. 17, 458–71 (1946). Unless otherwise indicated, the reaction mixture was worked up as follows. The reaction mixture was treated with dilute hydrochloric acid and then washed with water while agitating. The polymer was filtered and washed with water, then with acetone, dissolved in hot xylenes, filtered to remove inorganic materials and the filtrate then cooled to room temperature and diluted with acetone to precipitate the solid polymers.

*Example 1*

A glass pressure flask was charged with 50 ml. of decalin, 0.65 g. of sodium dispersed in 15 ml. of decalin, 0.85 g. of $TiCl_4$, and 0.1 g. of methanol. Ethylene was introduced and the contents were stirred at room temperature under an ethylene pressure of 50 p.s.i.g. for 24 hours. The production of polymer could be observed visually during the reaction, which produced 1.14 g. of white, flocculent polymer of ethylene of 0.9661 density and a melt viscosity of $1.4 \times 10^9$ poises.

When the procedure of Example 1 was repeated but methanol was omitted from the charge, only a slight amount of polymer (less than 0.1 g.) was produced.

*Example 2*

The procedure of Example 1 was repeated, except that the following was charged: 50 cc. of n-heptane, 0.43 g. of $TiCl_4$, 0.65 g. of Na dispersed in 10 cc. of n-octane and 0.1 g. of n-butyl alcohol. Ethylene was introduced and the contents stirred at room temperature for 21 hours. The formation of polymer proceeded rapidly after a short induction period. The yield was 6.46 g. of flocculent, white polymer of ethylene.

When the procedure was repeated but n-butyl alcohol was omitted from the charge, only 0.31 g. of polymer was produced in 23 hours.

*Example 3*

The procedure of Example 2 was repeated, but 0.1 g. of isopropyl alcohol was substituted for the n-butyl alcohol. The yield was 4.15 g. of flocculent, white polymer of ethylene in 23 hours.

*Example 4*

The procedure of Example 2 was repeated with the following charge: 0.43 g. $TiCl_4$, 0.65 g. of Na dispersion in 10 cc. n-octane, 0.9 g. of n-butyl chloride, and 0.05 g. of n-butyl alcohol. Ethylene was introduced and the contents were stirred at room temperature for 18 hours. The yield was 4.73 g. of solid, white polyethylene.

*Example 5*

The procedure of Example 2 was repeated, but 0.1 g. of n-decyl alcohol was substituted for the n-butyl alcohol. The yield was 4.17 g. of flocculent, white polyethylene in 20 hours.

*Example 6*

The procedure of Example 2 was repeated, but 0.1 g. of phenol was substituted for the n-butyl alcohol. The yield of solid, white polyethylene produced in 20 hours was 1.18 g.

*Example 7*

A glass pressure flask was charged with 50 ml. n-heptane, 0.35 g. Na, 0.1 g. isopropanol and 0.43 g. of $TiCl_4$ at room temperature. Ethylene was introduced to 50 p.s.i.g. and polymerization was carried on for 23.5 hours with intermittent introduction of ethylene. The reaction yielded 4.15 g. of solid polyethylenes having a melt viscosity of $1.3 \times 10^9$ poises and density of 0.9609.

*Example 8*

A stirred, glass reactor was charged with 50 ml. n-heptane, 6.9 g. Na, 9 g. of N-butyl chloride, 4.7 g. $TiCl_4$ and 0.4 g. of n-butanol. Ethylene was introduced shortly after the catalyst components were mixed and allowed to polymerize at 30° C. and initial pressure of about 1.5 p.s.i.g. for 16 hours, with intermittent introduction of further quantities of ethylene. This operation yielded 7.3 g. of a tough, solid polymer of ethylene having a melt viscosity of $2.3 \times 10^8$ poises and density (24/4° C.) of 0.9555.

It was found possible readily to scale this procedure up to produce more polymer in one operation, as will be illustrated by the following example.

*Example 9*

A stirred, glass reactor was charged with one liter of n-heptane, 11.5 g. Na, 23.5 g. of n-butyl chloride, 1.5 g. of n-butanol and 26.6 g. of $TiCl_4$. Ethylene was introduced to an initial pressure of 1.5 p.s.i.g. and polymerization was effected at 30° C. for 20 hours, with intermittent ethylene repressuring into the reactor. This operation yielded 109 g. of a polymer of ethylene having a melt viscosity of $1.7 \times 10^8$ poises and density (24/4° C.) of 0.9425.

*Example 10*

A glass reactor was charged with 75 ml. n-heptane, 1.3 g. Na, 2.7 g. of n-amyl chloride, 0.05 g. of n-butanol and 0.19 g. $TiCl_4$. Ethylene was then introduced to a pressure of 1.5 p.s.i.g. and was allowed to polymerize at 25 to 58° C. for 4 hours. The reaction mixture was worked up to yield 13.7 g. of a polymer of ethylene having a melt viscosity of $3.3 \times 10^9$ poises and density (24/4° C.) of 0.9313.

Our invention can be substantially extended from the specific illustrations thereof which have been supplied. Thus, the novel catalysts can be applied to the treatment of any organic compound containing an ethylenic linkage which is susceptible of addition polymerization, for example, the well known vinyl monomers, which need not be specified in detail herein (cf. C. E. Schildknecht, "Vinyl and Related Polymers," John Wiley & Sons, N.Y. (1952)). A particularly important application of the catalysts of the present invention is for the polymerization of vinyl monoolefinic hydrocarbons, the term "vinyl" being defined as $CH_2=CH-$ (C.A. 39, 5966 (1945)). The vinyl monoolefinic hydrocarbons have the general formula $$RCH=CH_2$$

wherein R is selected from the group consisting of hydrogen and saturated monovalent hydrocarbon radicals, i.e. hydrocarbon radicals containing no ethylenic unsaturation, viz. alkyl, cycloalkyl and aryl radicals, which generic classes also include the subgeneric classes of radicals such as arylalkyl, cycloalkylaryl, alkylcycloalkyl, arylcycloalkyl, cycloalkylaryl and alkaryl.

Vinyl alkene monomers are important feed stocks for use in the present polymerization process because of their availability in large volume and reasonable cost. These feed stocks have the generic formula $$RCH=CH_2$$

wherein R is hydrogen or an alkyl radical. Specifically, suitable vinyl alkene feed stocks comprise ethylene, propylene, 1-butene, 1-pentene, 1-hexene and mixtures of one or more of these alkenes, or the like.

The process of the present invention can also be applied to polyolefinic hydrocarbons, especially conjugated alkadienes such as 1,3-butadiene, isoprene, piperylene, 4-methyl-1,3-pentadiene or to non-conjugated alkadienes such as 1,5-hexadiene or the like. These monomers can be polymerized alone or in mixtures with other vinyl monomers, especially vinyl monoolefinic hydrocarbons such as ethylene, propylene, styrene and the like, employing desired proportions of each monomer in a composite feed stock.

Vinyl arenes are suitable feed stocks, used alone or as comonomers with vinyl alkenes or conjugated alkadienes. Examples of vinyl arenes are styrene, nuclearly alkylated (especially methylated) styrenes, nuclearly halogenated styrenes and the like.

The invention can also be applied to such highly reactive olefins as indene and the like. The invention may be applied to 2-butene, 2-pentene, isobutylene, 2-methyl-2-butene, tetrafluoroethylene, 5-methyl-1-hexene, trifluorochloroethylene, t-butylethylene and the like, these olefins being employed as the sole feed stock or in minor proportions based upon some other monomer such as ethylene, propylene or the like.

It will be understood that the various monomers are not equivalents for the purposes of our invention and vastly different polymers can be secured by varying the feed stock. Our invention is especially useful and yields unexpected results when the monomer is a normally gaseous, unbranched 1-alkene, especially ethylene and/or propylene.

In the preparation of suitable polymerization catalysts, any of the alkali metals or alloys, or mixtures of alkali metals, or hydrides or hydrocarbon derivatives of alkali metals can be employed. Suitable alkali metal alloys include the amalgams, Na-K liquid alloys, lead-sodium alloys, e.g. PbNa$_4$, and the like. The alkali metals are lithium, sodium, potassium, rubidium and cesium; they form hydrides having the general formula MH, wherein M represents an alkali metal. The alkali metals form a variety of hydrocarbon derivatives having the general formula MR, wherein R represents a monovalent hydrocarbon radical which may be saturated or unsaturated, for example, an alkyl, aryl, aralkyl, alkaryl, cycloalkyl, conjugated cyclodienyl, and other hydrocarbon radicals. Suitable alkyl radicals include methyl, ethyl, propyl, isopropyl, butyl, isobutyl, amyl, octyl, dodecyl, hexadecyl, octadecyl, eicosyl, and the like, for example, as in ethyl sodium, methyl lithium, butyl lithium, methyl sodium, octyl potassium. Other suitable alkali metal compounds include isopropyl potassium, benzyl sodium, sodium acetylides, allyl sodium, etc. Organo-alkali compounds can be prepared by conventional techniques in situ, e.g., by the reaction of an alkali metal with a highly reactive metal alkyl such as a dialkyl mercury, a dialkyl zinc or the like; by the reaction of alkyl or allylic halides with alkali metal, etc.

Salts of the following metals can be used in the preparation of polymerization catalysts for the purposes of our invention: Ti, Zr, Hf, Th, V, Nb, Ta, U, Cr, Mo, W, Mn, Fe, Co, Ni, Ru, Rh, Pd, Os, Ir, Pt or mixtures of salts of said metals. We can employ the metal salts of various mineral acids, for example, the hydrohalogen acids; oxyhalides, e.g., titanyl chloride or vanadyl chloride and the like; salts of acids of phosphorus, sulfur, nitrogen, etc. We may also use the specified metal cyanides, cyanates, isocyanates, thiocyanates, isothiocyanates, azides, etc. The salts of carboxylic or sulfonic acids may also be used. Also, we may use metal derivatives, classified herein as salts, having the formula M(OR)$_n$, wherein M represents the polyvalent metal, R is an alkyl or aryl radical, and $n$ is the valence of M, for example, $$Ti(OC_2H_5)_4, Ti(OC_3H_7)_4, Ti(OC_4H_9)_4$$

tetra-2-ethylhexyl titanate, tetrastearyl titanate, tetraphenyl zirconate and the like, for example, the metal derivatives of the enol forms of acetylacetone, acetoacetic ester and the like.

In addition to or in lieu of the aforesaid metal salts, we may employ freshly precipitated oxides of hydroxides of said metals, which can be prepared by techniques which are well known in inorganic chemistry.

It will be understood that the various alkali reagents do not yield precisely the same results and the same is true of the various metal salts which may be employed to prepare catalysts for use in our invention. The broad variety of reagents which can be used to prepare active polymerization catalysts affords great flexibility in our invention.

The preparation of the catalyst can be effected in the presence of various solid materials, such as carbon, silica, alumina, bauxite, fluorided alumina, synthetic or natural aluminosilicates, magnesia, titania, zirconia, powdered aluminum fluoride, sodium fluoride, sodium chloride, cryolite or the like. The added solid materials can comprise from about 10 to 2000 weight percent, based on the weight of the materials which are allowed to react to form the polymerization catalysts.

In some cases, maximum catalytic activity can be attained by depositing or sorbing the polyvalent metal salt on the surface of a solid material, e.g. by stirring a solution or dispersion of said polyvalent metal salt with the finely-divided support, thereafter adding the alkali reagent to effect partial reduction of said salt and the formation of an extended, supported catalyst.

A wide variety of alcohols may be employed as catalyst promoters for the purposes of the present invention. It is preferred that the hydroxyl group be the sole functional group of the promoter capable of reacting with the alkali reagent. In a more specific form of the invention, the hydroxyl group is the sole functional group in the promoter compound.

The promoting effect is most economically and readily attained through the use of a saturated alcohol, i.e. an organic compound consisting of a (parent) hydrocarbon structure containing no aliphatic (ethylenic or acetylenic) unsaturation and one or more hydroxyl groups substituted for a corresponding number of hydrogen atoms in the parent hydrocarbon structure. Examples of saturated alcohols which are useful in the practice of our invention are alkanols, cycloalkanols, phenols and the corresponding polyhydric alcohols.

Examples of alkanols include methanol, ethanol, n-propanol, isopropanol, 1-butanol, 2-butanol, t-butyl alcohol, 1-pentanol, 2-pentanol, 2-methyl-1-butanol, 1-hexanol, 2-hexanol, 1-heptanol, 3-heptanol, 1-octanol, 2-octanol, 2,4,4-trimethyl-2-pentanol, 5-nonanol, dodecanol, 1-tetradecanol, 1-octadecanol, benzyl alcohol, phenylmethylcarbinol, 2-phenylethanol, 3-phenylpropanol, cyclopentylcarbinol, or their mixtures, or the like.

Examples of cycloalkanols which can be used for the purposes of our invention include cyclopentanol, cyclohexanol, 1-methylcyclohexanol, 4-methylcyclohexanol, cycloheptanol, cyclooctanol, alphadecalol, or their mixtures, or the like.

Examples of phenols include phenol, the cresols and/or other alkyl or cycloalkyl phenols, e.g. p-ethylphenol, the xylenols, p-isopropylphenol, p-t-butylphenol, p-5-amylphenol, octylphenols, nonylphenols, pentadecylphenols, alpha-naphthol, beta-naphthol, or their mixtures, or the like.

Examples of polyhydric alcohols which can be employed for the purposes of our invention include ethylene glycol, 1,2-propanediol, 1,3-propanediol, 1,2-butanediol, 1,4-butanediol, erythritol, 1,4-pentanediol, 1,5-pentanediol, 1,1,1-tris-(hydroxymethyl)-ethane, pentaerythritol, 1,3-hexanediol, 2-methyl-1,3-pentanediol, 1,2-octadecanediol, 1,2-cyclohexanediol, 1,3-cyclohexanediol, 1,4-cyclohexanediol; o-, m-, or p-dihydroxy benzenes; p-hydroxy-benzyl alcohol, or their mixtures, or the like.

The polymeric products produced by the processes encompassed within the scope of our invention can be subjected to a variety of treatments designed to remove all or part of the catalytic materials therefrom. Thus the polymers can be washed with methanol, alcoholic alkalies, or the like in order to convert halide salts to the corresponding metal hydroxides.

The solid polymeric products can be dissolved in hot solvents, for example in unreactive hydrocarbons such as saturated or aromatic hydrocarbons, and the resultant solutions can be treated to separate polymer having relatively low content of material derived from the catalyst components. Thus hot hydrocarbon solutions of polymer can be subjected to the action of various hydrolytic agents to precipitate metal hydroxides which can then be separated from the remaining solution by centrifuging, decantation, filtration or other means. Alternatively, the hot hydrocarbon solution of polymer can be cooled or treated with precipitants or antisolvents such as acetone, methanol or the like to precipitate a small proportion, say up to about 5 weight percent of the solute polymer, which precipitate contains a very large proportion of the inorganic materials originally present in the polymer. The solvent can be recovered from the aforesaid operations and can be reused.

A desirable method for working up normally solid polymers of ethylene is to prepare a hot solution thereof in a normally liquid alkane, particularly in the $C_6$–$C_{12}$ range, having a solute concentration of the order of 2–3 weight percent, thereafter to filter said solution, optionally with a filter aid, through a conventional filter medium to remove suspended particles derived from the polymerization catalyst, thereafter to contact the filtrate with an adsorbent filter aid in order to effect selective adsorption of colloidal polymer particles from the hot filtrate, thereafter to filter the hot filtrate and treat it to recover the purified ethylene polymer remaining in solution. This object can be achieved simply by cooling the filtrate to produce a precipitate of white polyethylene which is readily filterable by conventional methods. Filter aid treatment may be effected prior to either the first or second filtration operations.

The polymers of the present invention can be used or treated as the polymers whose preparation is described in U.S. Patent 2,691,647 of Edmund Field and Morris Feller, granted October 12, 1954.

Having thus described our invention, what we claim is:

1. A process for the preparation of a normally solid polymer which comprises contacting ethylene with a polymerization catalyst prepared by admixing sodium with titanium tetrachloride in the presence of an added alkanol having from 1 to about 10 carbon atoms in the molecule in a proportion between about 0.01 and about 10% by weight, based on the weight of sodium, effecting contacting of ethylene with the catalyst at a temperature between about 10° C. and about 175° C., and recovering a normally solid polymer thus produced.

2. The process of claim 1 wherein said alkanol is methanol.

3. The process of claim 1 wherein said alkanol is isopropanol.

4. The process of claim 1 wherein said alkanol is n-butanol.

5. The process of claim 1 wherein an alkyl halide is added in a proportion between about 0.01 and about 0.5 mol per gram atom of sodium.

6. A process for the preparation of a normally solid polymer which comprises contacting ethylene with a polymerization catalyst prepared by admixing sodium with titanium tetrachloride in the presence of a minor amount of phenol the amount of said phenol being between about 0.01 and about 10% by weight, based on the weight of sodium, effecting contacting of ethylene with the catalyst at a temperature between about 10° C. and about 175° C. and recovering a normally solid polymer thus produced.

7. In a process for the preparation of a normally solid polymer which comprises contacting ethylene with a polymerization catalyst prepared by admixing an alkali metal with titanium tetrachloride, the improvement of effecting said contacting under polymerization reaction conditions including a temperature in the range between about 0° C. and about 250° C. in the presence of an added alcohol having from 1 to about 10 carbon atoms in the molecule, the proportion of said added alcohol being between about 0.01 and about 20% by weight based on the weight of said alkali metal and sufficient to effect substantial promotion of the activity of said polymerization catalyst, and recovering a polymer thus produced.

References Cited in the file of this patent

UNITED STATES PATENTS

| | | |
|---|---|---|
| 2,691,647 | Field et al. | Oct. 12, 1954 |
| 2,758,953 | Cottle et al. | Aug. 14, 1956 |
| 2,843,577 | Friedlander et al. | July 15, 1958 |
| 2,845,412 | Heyson | July 29, 1958 |

FOREIGN PATENTS

| | | |
|---|---|---|
| 682,420 | Great Britain | Nov. 12, 1952 |
| 538,782 | Belgium | Dec. 6, 1955 |
| 785,314 | Great Britain | Oct. 23, 1957 |